United States Patent
Farshchian

(10) Patent No.: US 10,451,275 B2
(45) Date of Patent: Oct. 22, 2019

(54) APPARATUS AND METHOD FOR CONTROLLING A PRESSURE GAIN COMBUSTOR

(75) Inventor: Soheil Farshchian, Santa Clara, CA (US)

(73) Assignee: EXPONENTIAL TECHNOLOGIES, INC., Calgary, Alberta (CA)

( * ) Notice: Subject to any disclaimer, the term of this patent is extended or adjusted under 35 U.S.C. 154(b) by 1214 days.

(21) Appl. No.: 14/114,697

(22) PCT Filed: Apr. 27, 2012

(86) PCT No.: PCT/CA2012/000405
§ 371 (c)(1),
(2), (4) Date: Jun. 9, 2014

(87) PCT Pub. No.: WO2012/145836
PCT Pub. Date: Nov. 1, 2012

(65) Prior Publication Data
US 2014/0260294 A1    Sep. 18, 2014

Related U.S. Application Data

(60) Provisional application No. 61/481,117, filed on Apr. 29, 2011.

(51) Int. Cl.
*F23N 5/20* (2006.01)
*F02C 5/10* (2006.01)
(Continued)

(52) U.S. Cl.
CPC ............ *F23N 5/20* (2013.01); *F02C 5/10* (2013.01); *F02C 5/11* (2013.01); *F02C 7/22* (2013.01);
(Continued)

(58) Field of Classification Search
CPC ...... F02C 5/00; F02C 5/10; F02C 5/11; F02C 5/12; F02C 9/28; F02C 9/26; F02C 7/22;
(Continued)

(56) References Cited

U.S. PATENT DOCUMENTS 4,767,313 A * 8/1988 Lockwood, Jr. .......... F02G 1/02
431/1
4,819,873 A * 4/1989 Lockwood, Jr. .......... F02G 1/02
239/416.1
(Continued)

FOREIGN PATENT DOCUMENTS

WO WO2007112442 A2 10/2007
WO WO2010031173 A1 3/2010

OTHER PUBLICATIONS

Extended European Search Report for European application 12777479.2 dated Jan. 22, 2015.
(Continued)

*Primary Examiner* — Alain Chau
(74) *Attorney, Agent, or Firm* — Gavin J. Milczarek-Desai; Quarles & Brady LLP

(57) ABSTRACT

A method of controlling operation of a pressure gain combustor comprises: determining a fuel injector duty cycle and a combustion frequency that meets a target load set point and a target fill fraction of the combustor; determining a fuel supply pressure setting, a fuel injector timing setting and an ignition timing setting that achieves the determined fuel injector duty cycle and combustion frequency; and sending a fuel supply pressure control signal with the fuel supply pressure setting to a fuel pressurizing means of the combustor, a fuel injector control signal with the fuel injector timing setting to a fuel injector of the combustor, and an ignition timing control signal with the ignition timing setting to an ignition assembly of the combustor.

16 Claims, 5 Drawing Sheets

(51) Int. Cl.
*F23N 5/00* (2006.01)
*F23R 7/00* (2006.01)
*F02C 7/22* (2006.01)
*G05D 7/06* (2006.01)
*F02C 5/11* (2006.01)
*F02K 7/02* (2006.01)
*F02C 9/26* (2006.01)
*F23N 5/18* (2006.01)

(52) U.S. Cl.
CPC ............... *F02C 9/26* (2013.01); *F02K 7/02* (2013.01); *F23N 5/00* (2013.01); *F23R 7/00* (2013.01); *G05D 7/0617* (2013.01); *F23C 2205/10* (2013.01); *F23N 2005/181* (2013.01); *F23N 2005/185* (2013.01); *Y02T 50/677* (2013.01)

(58) Field of Classification Search
CPC ...... F02K 7/02; F02K 7/06; F23R 7/00; F23C 15/00; F23C 2205/00; F23C 2205/10; F23C 2205/20; F23N 2005/181; F23N 2005/185; F23N 5/00; F23N 5/20; F05D 2260/16; G05D 7/0617
See application file for complete search history.

(56) References Cited

U.S. PATENT DOCUMENTS

| | | | | |
|---|---|---|---|---|
| 5,123,835 | A * | 6/1992 | Richards | F23C 15/00 122/24 |
| 5,349,811 | A * | 9/1994 | Stickler | F02C 9/28 60/39.281 |
| 6,505,462 | B2 | 1/2003 | Meholic | |
| 7,637,096 | B2 | 12/2009 | Razzell et al. | |
| 7,758,334 | B2 * | 7/2010 | Shimo | F02K 7/04 431/1 |
| 8,726,630 | B2 * | 5/2014 | Pinard | F02K 7/02 60/247 |
| 2007/0180814 | A1 * | 8/2007 | Tangirala | F02K 7/02 60/204 |
| 2007/0245712 | A1 * | 10/2007 | Shimo | F02K 7/04 60/249 |
| 2008/0229756 | A1 * | 9/2008 | Pinard | F02K 7/02 60/776 |
| 2009/0139203 | A1 * | 6/2009 | Rasheed | F02C 5/02 60/247 |
| 2010/0154380 | A1 | 6/2010 | Tangirala et al. | |
| 2011/0005420 | A1 * | 1/2011 | Fullerton | F02K 7/02 102/202.7 |
| 2011/0048703 | A1 | 3/2011 | Farshchian et al. | |
| 2011/0126511 | A1 * | 6/2011 | Glaser | F02C 5/00 60/248 |
| 2012/0324860 | A1 * | 12/2012 | Shimo | F02C 3/165 60/39.76 |

OTHER PUBLICATIONS

International Search Report and Written Opinion for PCT/CA2012/000405.

* cited by examiner

APPARATUS AND METHOD FOR CONTROLLING A PRESSURE GAIN COMBUSTOR

FIELD

This invention relates generally to an apparatus and a method for controlling operation of a pressure gain combustor.

BACKGROUND

A pressure gain combustor, an example of which is a pulse detonation engine (PDE), is a type of combustion engine that uses detonation waves to combust a fuel and oxidizer (e.g. air) mixture. Each detonation wave is initiated by an ignition source, and the combustion process is pulsated to allow the mixture to be renewed in a combustion chamber between detonation waves. Unlike a conventional pulse jet engine in which a fuel/air mixture undergoes subsonic deflagration combustion, a pulse detonation in a pressure gain combustor undergoes supersonic detonation. The combustion process greatly increases the combustion products pressure inside the combustion chamber, which then expands through a nozzle for thrust or power generation. This thrust can be used to propel a vehicle, or be converted into a mechanical power, e.g. by a rotary positive displacement device like a turbine coupled to a drive shaft.

In the past few decades, pressure gain combustors have been actively pursued as one of the most promising power generation cycles. Pressure gain combustors have the potential to provide significantly higher efficiency compared to the other power generation cycles. To realize this potential, operation of the combustion process must be optimized. Conventional control systems for combustion engines monitor the operation of the engine and control the fuel supply, air/fuel ratio, ignition timing and other functionality based on input variables. However, given the differences between a pressure gain combustor and conventional combustion engines, such as the transient operation and pulsating flow through a pressure gain combustor, conventional control systems for are not well suited for controlling the operation of a pressure gain combustor.

SUMMARY

According to one aspect of the invention, there is provided a method of controlling operation of a pressure gain combustor having a fuel pressurizing means, a fuel injector, and an ignition assembly in an efficient and effective manner. The method comprises: determining a fuel injector duty cycle and a combustion frequency that meets a target load set point and a target fill fraction of the combustor; determining a fuel supply pressure setting, a fuel injector timing setting and an ignition timing setting that achieves the determined fuel injector duty cycle and combustion frequency; and sending a fuel supply pressure control signal with the fuel supply pressure setting to the fuel pump, a fuel injector control signal with the fuel injector timing setting to the fuel injector, and an ignition timing control signal with the ignition timing setting to the ignition assembly. The target fill fraction is preferably 1.0 but can be between 0.8 and 1.1.

The step of determining the fuel injector duty cycle can comprise measuring an air flow rate through the combustor and determining a fuel flow rate that meet the target load set point, or determining air and fuel flow rates that meet both the target load set point and a stoichiometric oxidant/fuel ratio. The step of determining the combustion frequency can comprise: determining a maximum fuel injection duration ("MID") in the combustor that is a function of the target fill fraction, and a required fuel injection duration per detonation cycle (IDDC) being the duty cycle divided by the combustion frequency, and selecting the combustion frequency such that the IDDC is less than or equal to the MID.

According to another aspect of the invention, a controller comprising a memory programmed with the above method and a processor for executing the programmed method is provided. The processor can be part of a combustor which comprises a fuel pressurizing means, a fuel injector fluidly coupled to the fuel pressurizing means, a mixing chamber fluidly coupled to the fuel injector and to an oxidant supply; a combustion chamber in fluid communication with the mixing chamber; and an ignition assembly in fluid communication with the combustion chamber.

The controller can be further programmed with the step of selecting at least one equivalence ratio, and determining a fuel flow rate that meets the target load set point and the selected equivalence ratio. The controller can also be further programmed with the step of measuring a pressure inside an oxidant/fuel mixing chamber of the combustor and wherein the fuel supply pressure setting provides a fuel supply pressure sufficient to deliver fuel into the mixing chamber to achieve the determined fuel flow rate. The controller can also be further programmed with the step of determining an ignition phase lag for the combustor and wherein the ignition timing control signal further includes the determining ignition phase lag.

DETAILED DESCRIPTION OF EMBODIMENTS OF THE INVENTION

Figure 1:
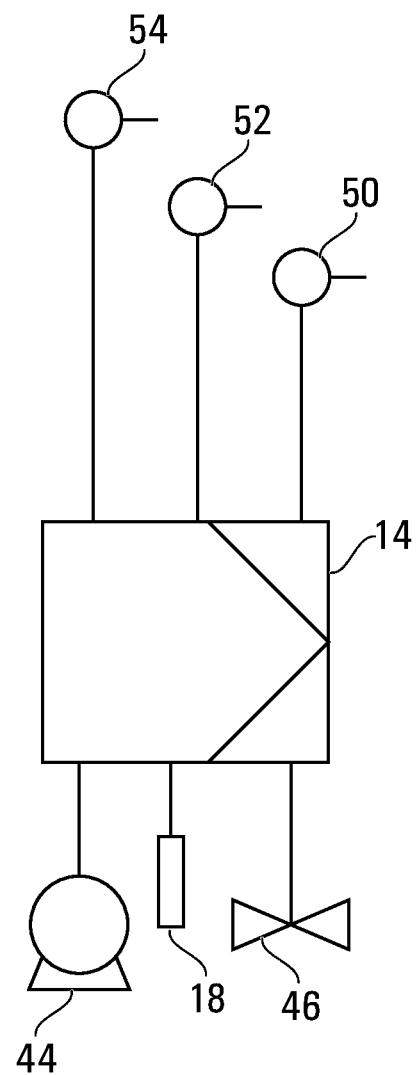
FIG. 1 is a schematic of an embodiment of a control system for a pressure gain combustor.

Described herein are embodiments of a pressure gain combustor control system that monitors and operates at least the fuel injection and ignition assemblies of a pressure gain combustor based on input variables and in such a way that optimizes available output power per size and inherent efficiency of the pressure gain combustor. With minor modification of the sort that would be apparent to those of skill in the art, the control system described herein may be utilized in various types of pressure gain combustors.

By way of background, a popular method used by control systems for conventional combustion engines to measure the air/fuel ratio in the combustion process is to utilize oxygen sensors in the exhaust stream. By measuring the residual oxygen content in the combustion products, a controller can calculate the air/fuel ratio that existed in a combustion chamber prior to combustion, and use a feedback control loop to adjust the ratio (typically by adjusting the fuel flow rate) to obtain the required output power and a proper air/fuel ratio in the combustion chamber.

However, in a pressure gain combustor, each combustion cycle includes the following general stages: intake, detonation, discharge and purge. During the purge process, air is passed through the combustor without being used in the combustion process. The purge air passes through the combustion chamber and exits through an exhaust system, therefore the additional oxygen present in the purge air would bias the readings of an oxygen sensor in the exhaust system of a pressure gain combustor. Accordingly, oxygen sensors cannot be effectively utilized for measuring or controlling the air/fuel ratio in a pressure gain combustor.

Another method of monitoring and adjusting the air/fuel ratio is to measure the air flow rate and to adjust the fuel flow rate based on the air flow rate. This method is known as a "feed-forward" approach, and is generally more suitable and effective for pressure gain combustors. As is described in further detail below, a control system according to certain embodiments of the invention utilizes a feed-forward approach for air and fuel flow regulation.

In conventional combustion engines, the output power of the engine is proportional to the mass flow rate of air that is active in the combustion. As noted above, in each combustion cycle of a pressure gain combustor, the combustor volume is filled with a mixture of air and fuel, combusted and then discharged and purged. Therefore, in order to maximize the output power per size of a given pressure gain combustion engine, the operational frequency of the combustor must be maximized. Maximum operational frequency may, however, be limited by factors such as combustor chamber aerodynamics, ignition system and/or fuel injection system limitations, and required air/fuel mixing time, any of which may decrease efficiency at high operating frequencies.

Another parameter to consider in relation to the efficiency of pressure gain combustors is the fill fraction. Fill fraction is the ratio of the volume of air/fuel combusted in each combustion cycle to the total volume of the combustor. In pressure gain combustors that utilize a deflagration to detonation transition ("DDT"), a portion of the air/fuel is combusted in the DDT process prior to detonation. This DDT combustion process is not as efficient as constant volume detonation, so it is desirable to minimize the DDT distance, which in turn will maximize the portion of the air/fuel mixture that is available to be consumed in the detonation process. The amount of air and fuel required for the DDT process is not dependent on the amount of air and fuel burnt after the detonation is achieved. Therefore, if lower fill fractions are used, a relatively high proportion of the air and fuel will be used in the relatively low efficiency DDT process, and relatively little combustible mixture will be available for the detonation process. This decreases the combustor efficiency. On the other hand, if the maximum volume of air and fuel mixture is prepared in the combustion chamber, the ratio of detonation combustion to DDT process increases and therefore the efficiency of the combustor increases.

In accordance with one embodiment of the invention and referring to FIGS. 1 to 5, a control system 10 for a pressure gain combustor 12 is provided with a controller 14 having a memory programmed with a control program which regulates air and fuel flow rates of a fuel injection assembly 16 and controls operation of an ignition assembly 18 of the combustor 12, in order to obtain a required output power (or "load"). The control program includes instructions executed by the controller 14 to maintain a proper air/fuel ratio in a combustion chamber 20 of the combustor 12, in a manner which maximizes fill fraction, thereby optimizing the combustion efficiency at any given operational frequency. To optimize operational frequency and the available power output per size of combustor, the controller 14 also regulates fuel delivery throughout an intake stage of the combustion cycle so as to minimize the time required for air/fuel mixing. In order to achieve this, the controller 14 adjusts the fuel injection flow rate proportional to the airflow in the combustor 12 such that it provides a substantially stoichiometric mixture of air and fuel throughout the combustor chamber 20 while minimizing the time and space required for air and fuel mixing.

Figure 3:
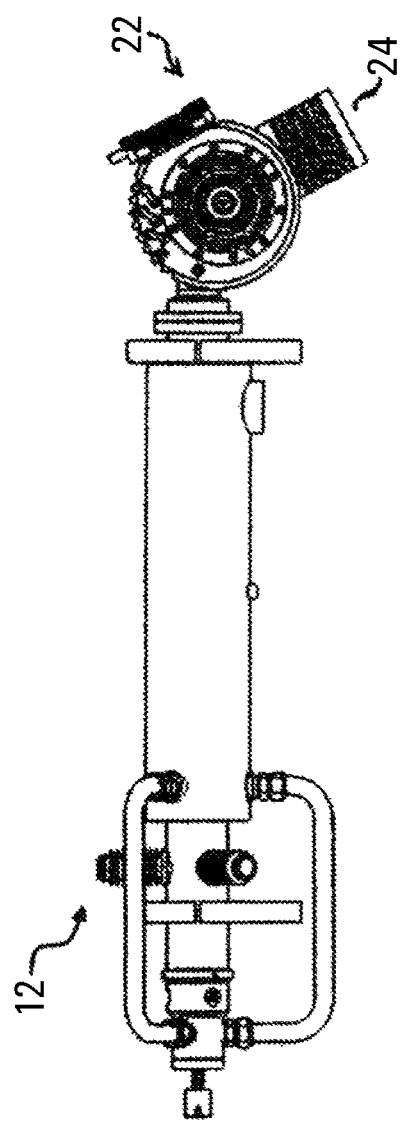
FIGS. 3 and 4 are schematic side external and cut-away views of one embodiment of a pressure gain combustor controlled by the controller.
Figure 4:
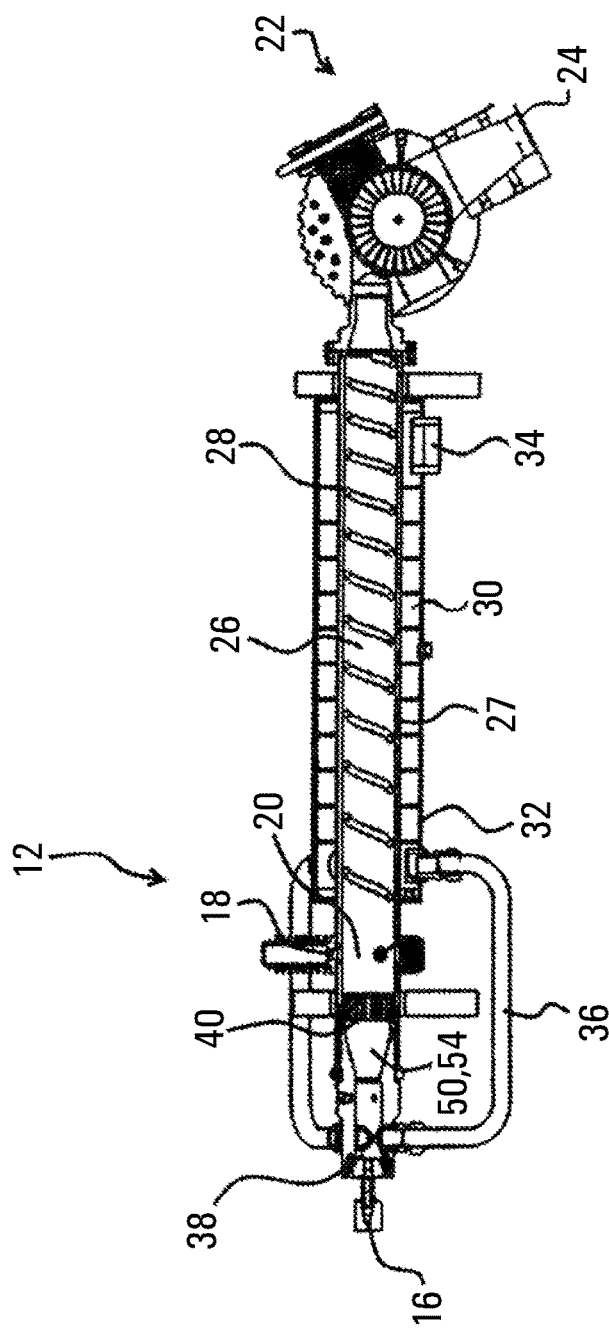
Figure 5:
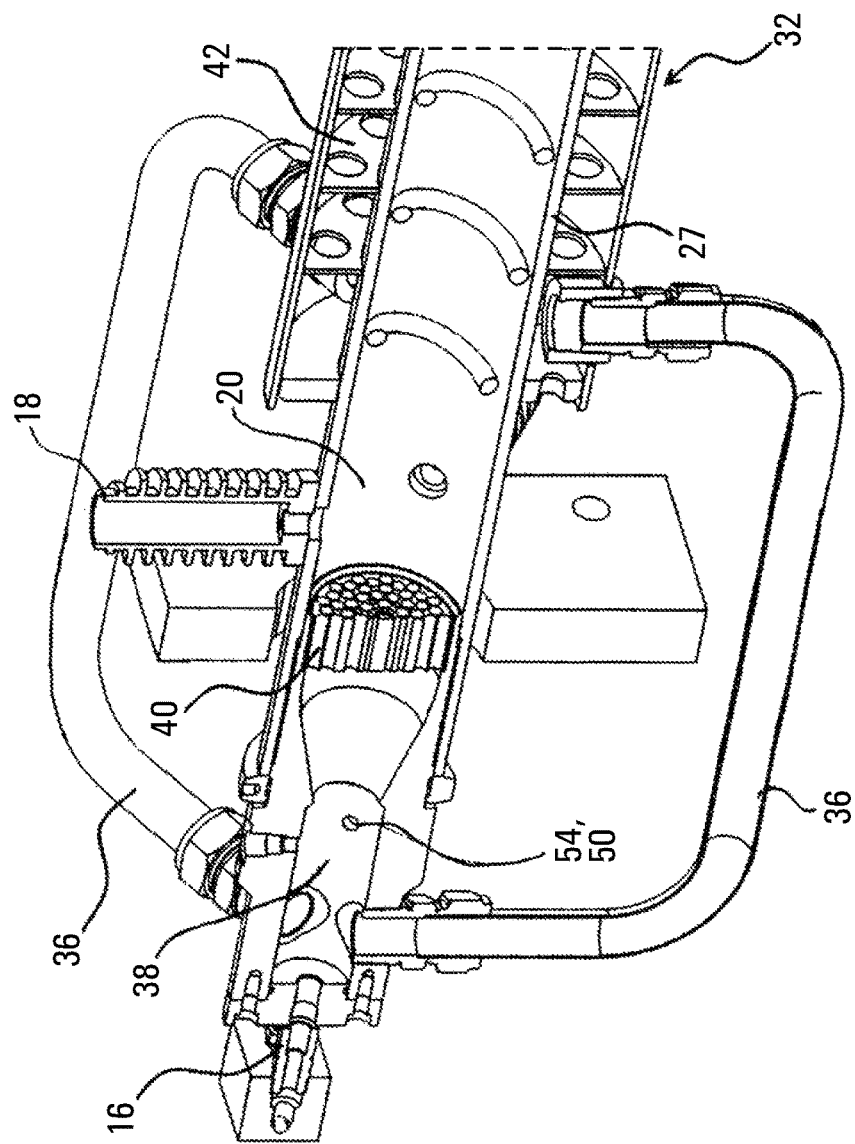
FIG. 5 is a perspective cut-away view of a mixing chamber and a combustion chamber of the combustor shown in FIGS. 3 and 4.

Referring specifically to FIGS. 3 to 5, a suitable combustor 12 is a pulse detonation device, which in this embodiment is shown coupled to a rotary motion positive displacement device 22 which converts thrust discharged from the combustor into useful rotary motion. Alternatively, the combustor 12 can be coupled to a compressor and turbine system (not shown). The thrust is discharged as exhaust from exhaust port 24 of the rotary motion positive displacement device 22. The combustor comprises a detonation region 26 which in this embodiment is an inner tubular body 27 having mounted therein Schelkin spirals 28, which can be in a helical orientation and in one form be an insert, such as a helical member inserted and fixedly attached to the tubular body. The distance between the rotations of the helical portion of the Schelkin spiral 28 can increase in frequency, or otherwise the pitch between spirals can be reduced (or in some forms increase depending on the expansion of the gas), pursuant to the velocity of the gas therein.

A heat transfer assembly comprises an annular channel 30 defined as the space between the inner tubular body 27 and an outer tubular body 32. An entrance port 34 is provided on the outer tubular body 32 and allows a gaseous oxidant, such as compressed air, to enter into the annular channel 30 and travel in a countercurrent fashion wherein heat from within the detonation region 26 is transferred into the annular channel 30 and serves to pre-heat the oxidant traveling therethrough. As can be most clearly seen in FIG. 5, fins 42 can be provided within the heat transfer assembly to further allow the oxidant to transfer through the annular channel 30.

The oxidant then travels through gas transfer tubes 36 to an oxidant/fuel mixing chamber 38, wherein the preheated oxidant will mix with a fuel injected by the fuel injection assembly 16 to form an oxidant/fuel mixture. The fuel injection assembly 16 serves to inject fuel into the mixing chamber in amounts and according to a timing prescribed by the controller 14. More particularly, the fuel injector assembly 16 comprises a fuel injector with an injection port in communication with the mixing chamber, and a fuel pressurizing means 44 (shown schematically in FIG. 1) fluidly coupled to the fuel injector and communicative with and controllable by the controller 14. A suitable fuel pressurizing means can be a pump or compressor with pressure regulator. The fuel injector comprises a control valve 46 (shown schematically in FIG. 10 that is also communicative with and controllable by the controller 14 to control the duration the fuel injector is activated (i.e. control valve opened) per unit of time; in other words, the controller 14 by controlling the opening of the control valve, controls the duty cycle of the fuel injector.

Once mixed in the mixing chamber 38, the oxidant/air mixture will pass through a diffuser 40 and into the combustion chamber 20. The diffuser 40 is designed to stratify the gas mixture prior to the combustion chamber 40. In general, the diffuser can be a variety of designs, where in the embodiment shown in FIGS. 3 to 5, a plurality of holes defined by longitudinally extending services reduce the spiral action of the mixture for proper detonation.

After passing through the diffuser 40, the now stratified oxidant/fuel mixture flows into the detonation region 26. The oxidant/fuel mixture that is in the combustion chamber 20 portion of the detonation region 26 is combusted by energy provided by the ignition assembly 18. The ignition assembly 18 comprises one or more oxidant/fuel detonators in fluid communication with the combustion chamber 20 and communicative with and controllable by the controller 14. The detonators can be conventional spark plugs or glow plugs, or alternatively a laser ignition device or another device that provides sufficient energy to detonate the oxidant/fuel mixture.

Once the fuel/air mixture in the combustion chamber 20 is combusted, a flame front becomes coupled to a shock wave and propagates through the detonation region 26 at supersonic velocities, thereby detonating the rest of the fuel/air mixture therein.

As noted above, the controller 14 is programmed to control the operation of the combustor to produce a required power output in an efficient manner. As will be described in detail below, the controller 14 maintains a proper oxidant/fuel ratio to meet the required load by regulating the fuel flow rate. This is done by controlling fuel supply pressure and fuel injection duration. Fuel supply pressure is controlled by controlling operation of the fuel pressurizing means 44, and fuel injection duration and timing is controlled by controlling the control valve 46 of the fuel injector. In general, varying the fuel supply pressure changes the fuel flow rate during fuel injection. Changing the fuel injection duration can also be used to control the amount of fuel that is injected into the combustion chamber 20 per unit time.

In order to optimize the efficiency of fuel delivery to the combustor chamber 20 (and to optimize the consequent efficiency of the detonation stage of each combustion cycle), the controller 14 is programmed to inject fuel in a "proportional" manner, whereby the fuel injection flow rate is controlled to be proportional to the air flow rate past the fuel injector during each intake cycle so as to obtain a substantially stoichiometric air/fuel mixture passing the injection point of the fuel injector 24. Accordingly, an air flow sensor 54 is provided in the mixing chamber 38 near the fuel injector port, and sends air flow measurement data to the controller 14.

Proportionally injecting fuel in this manner is expected to reduce the time required for oxidant/fuel mixing in the mixing chamber 38, and to reduce the need for fuel dispersion between different regions in the combustor chamber 20. Conversely, if the fuel injection flow rate was not adjusted in proportion to the air flow rate, then changes in airflow rate during the intake stage of the combustion cycle may cause the injected fuel to be concentrated more highly in one region of the mixture, and significantly more time may thus be required to disperse the higher concentration of fuel into the lower concentration regions.

The controller 14 in this embodiment is further programmed to consistently maintain a substantially stoichiometric air/fuel mixture, by continuously regulating the fuel flow rate throughout the intake stage of the combustion cycle, such that the fuel flow rate during fuel injection is proportional to the air flow rate at each point in time throughout the duration of fuel injection. In this way, the required time for the mixing of air and fuel should be substantially reduced, enabling the combustor 12 to operate at a higher operational frequency or detonation rate. As noted above, this is expected to optimize the output power to size ratio of the combustor 12. In addition, a higher operational frequency provides more continuous power delivery, and permits the use of a more compact combustor for a given range of output power requirements. Continuously adjusting the fuel injection flow rate proportional to the air flow rate is expected to increase the convective mixing performance in the combustor 12 and reduce the time and distance required for air and fuel to be mixed by diffusion.

The controller 14 can adjust the fuel flow rate by adjusting the pressure differential across the fuel injector. A pressure sensor 50 is located in the mixing chamber 38 and is communicative with the controller 14 to provide a mixing chamber pressure measurement. With this reading, the controller 14 is programmed to calculate the required pressure differential to achieve the required fuel flow rate, and adjusts the fuel pressurizing means 44 setting to change the fuel line pressure (upstream the injector 24) in order to achieve this required pressure differential. For a gaseous fuel combustor, the controller 14 controls a compressor/pressure regulator that pumps gaseous fuel into the mixing chamber 38. In a liquid fuel combustor, the controller 12 is programmed to control the fuel flow rate by other means, such as by controlling the fuel injector control valve 46 thereby controlling the fuel injection rate at the injection point.

As would be apparent to those of skill in the art, the controller 14 of the present embodiment can be programmed to control both pressure gain combustors that use valves to control air flow or that feature a valveless air flow design. The present embodiment of the pressure gain combustor as shown in FIGS. 3 to 5 is an valveless air flow design.

While the present description explains the control for a combustion cycle without an air valve, a combustor with an air valve can be similarly controlled. In pressure combustors with an air valve (not shown), the controller 14 will open the air valve during the fuel injection period to provide air for combustion and will also open the air valve during purge to provide purge air. The controller 14 closed the at air valve at all other times.

Figure 2:
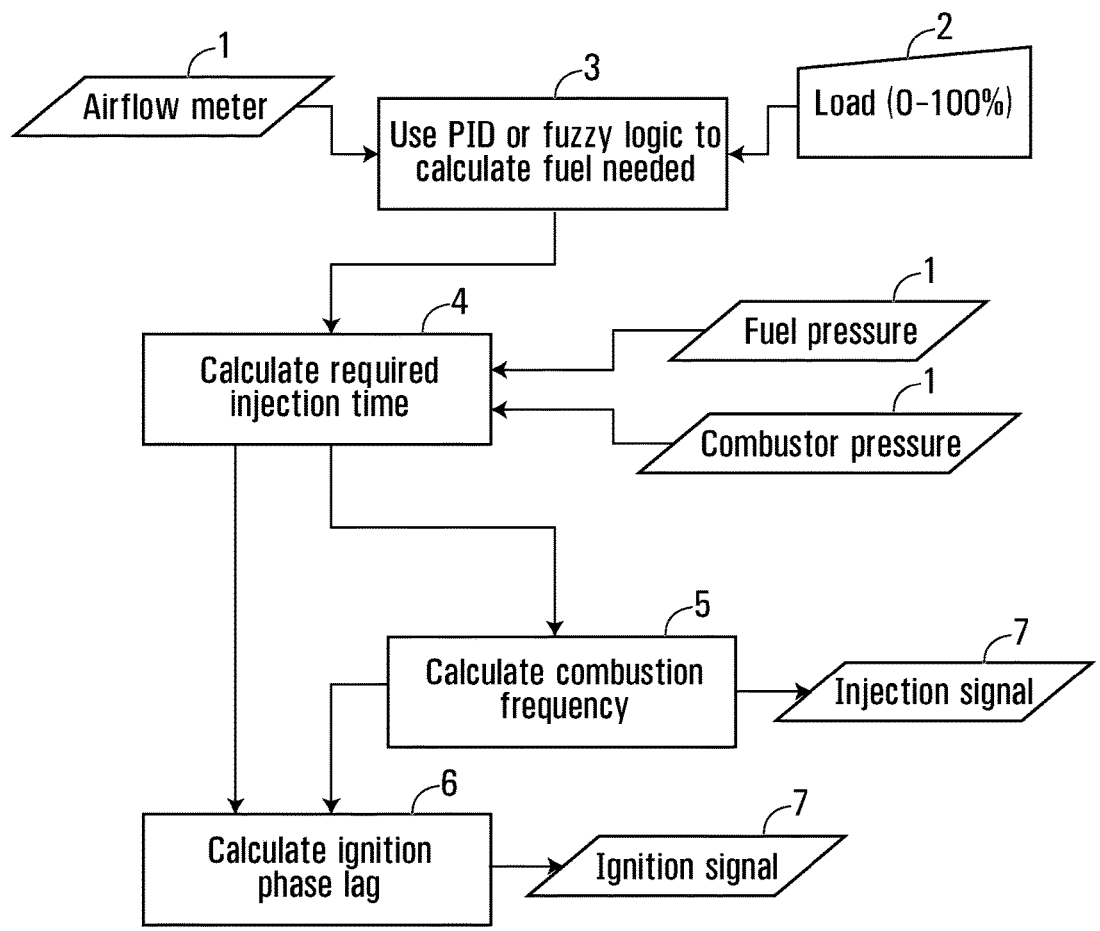
FIG. 2 is a flow chart of steps carried out by a controller to control operation of the pressure gain combustor.

The controller 14 is this embodiment is a programmable logic controller with proportional-integral-derivative functionality ("PID controller"); however, other controllers having similar functionality can be substituted as would be apparent to those skilled in the art. Referring specifically to FIG. 2, the controller 14 includes a processor and a memory having programmed with a control algorithm comprising the following steps that define a control loop and which are executed by the processor to achieve the goal of operating the combustor 12 to meet a required power output in an efficient manner:

1—Measure the Current Operational Conditions in the Combustor

Sensors are located in or around the combustor 12 to monitor various operational conditions thereof and the measurements taken by these sensors are used as inputs by the controller 14. These measurements include: air flow rate measured by the air flow meter 54 and mixing chamber pressure measured by the pressure sensor 50.

Another operational condition input to the controller 14 is load input 52. The load input 52 can be provided by a direct input means such as a gas pedal, a computer keyboard, or any other human user interface (not shown), or be provided by a sensor for measuring data used to indirectly calculate the required load input, e.g. a sensor used to measure the rotational speed of a rotary motion positive displacement device.

2—Ascertain Load Input and Calculate Required Combustor Power Output

In most conventional combustion engines, a controller acquires an input signal for a required load from an external signal source such as a gas pedal. The controller 14 adjusts the actual engine output power based on the required output power, as indicated by the input signal. The load input may also be indirectly defined for an engine. For example, in stationary engines, the engine controller is often programmed to keep the engine speed at certain set point. The controller monitors the shaft speed and adjusts the power output constantly to maintain the required shaft speed. If actual load is increased, the shaft speed will decrease, so the controller will increase the engine output power to compensate for the increased power requirement and raise the shaft speed to the required set point. Similarly, if actual load is reduced and shaft speed increases, the controller will decrease engine output power to reach the speed set point.

In this embodiment, the controller 14 can operate with both direct and indirect required load input signals. When the load input 52 measures a direct input, the required combustor power output can be calculated directly from the information received from this input to produce a target load set point. If the load input 52 measures an indirect input like rotational speed, the controller 14 will have stored in its memory a desired rotational speed of the rotary motion positive displacement device and calculates the target load set point by subtracting the stored and measured values.

3—Adjust the Required Fuel Flow Rate Based on the Required Load Input or Target Load Set Point from Step 1

In this step, the controller 14 calculates the required fuel flow rate based on the required load input ascertained at step 2. If a higher or lower combustor output power than is presently provided (based on a target load set point established for the last combustion cycle) is required, then the required fuel flow rate is increased or decreased accordingly such that the required new target load set point is achieved.

In one embodiment, the controller 14 is programmed to continuously vary fuel supply pressure in the fuel supply line (upstream the fuel injector) such that the fuel flow rate is proportional to the air flow rate throughout the duration of the fuel injection. In particular, the controller 14 is programmed to calculate a fuel flow rate which maintains a substantially stoichiometric air/fuel ratio in the combustor 12, using the load input and measured air flow rate.

4—Calculate the Injector Duty Cycle (i.e. The Injector Duration Per Unit of Time) for the Current State In this step the controller 14 calculates the fuel injector duty cycle. The fuel injector duty cycle is the measure of fuel injector activation per unit of time (i.e. the amount of time the fuel injector needs to be activated per unit time) and can be expressed mathematically as $$\text{Injector duty cycle} = \frac{\dot{m}_f}{\dot{m}_{Injector]}}$$

wherein
$\dot{m}_f$ is the required fuel flow rate calculated in step 3; and
$\dot{m}_{injector}$ is the fuel flow rate through the fuel injector when the fuel injector is continuously activated, which is a function of the pressure differential between the upstream fuel line pressure and mixing chamber pressure.

5—Calculate the Detonation Rate (Combustion Frequency) Required for the Required Fuel Flow Rate.

Combustion frequency is calculated based on the air flow rate, combustor volume and fill fraction. As noted above, fill fraction is the ratio of the volume of air and fuel combusted in each combustion cycle to the total volume of the combustor 12.

Having calculated the required fuel injection duration per unit of time (i.e. the fuel injector duty cycle) at step 4, the controller 14 now determines the combustion frequency and the fuel injection duration per combustion cycle that are required to meet a target fill fraction of the combustion chamber, (hereinafter referred to as "required combustion frequency" and "required fuel injection duration per detonation cycle" or "IDDC").

The lower bound of the fill fraction is limited by the ignitability of the ignition source and the fuel-air mixture. The fill fraction for example could be as low as 0.1. However, the target fill fraction is preferably selected to be as close as possible to unity for each detonation; a larger fill fraction gives higher combustion efficiency, as relatively more of the fuel will be burned in the detonation process. To account for practical limitations such as non-linearities and other non-ideal conditions, the target fill fraction can be selected to be somewhat less than or greater than one, and in particular, the controller 14 can be programmed to operate with a target fill fraction of between 0.8 and 1.1.

In order to achieve a maximum fill fraction of unity, a stoichiometric mixture of air and fuel should fill the entirety of the combustion chamber 20. Since the fuel injection rate is proportional to the air flow rate (combining into a substantially stoichiometric mixture), and since the air and fuel fronts proceed through the combustor chamber 20 at the same rate; the time duration for the fuel to travel the distance from the fuel injector 16 to a discharge outlet of the combustor 12 can be calculated by dividing the distance between fuel injector 16 and the combustor discharge outlet by the oxidant/fuel mixture velocity. The controller 14 approximates the oxidant/fuel mixture velocity by reference to the average air speed in the combustor 12 as calculated by air flow meter 54. Therefore, the maximum fuel injection duration possible per detonation cycle without allowing fuel to exit the combustor (i.e. when the fill fraction is 1) is calculated by the controller 14 as:

$$\text{Maximum Injection duration} = \frac{\text{Injector distance to end of combustor}}{\text{Air speed in combustor}}$$

Having calculated the maximum fuel injection duration per combustion cycle, the controller 14 compares this value ("maximum injection duration" or "MID") with the required fuel injection duration per detonation cycle ("IDDC"). The controller 14 calculates the IDDC by dividing the duty cycle calculated in step 4 by the number of detonation cycles in each unit of time (i.e. the required combustion frequency) using the value as determined by the previous control loop. If the IDDC is larger than current MID, then the controller 14 increases the combustion frequency value until the IDDC is lowered below the MID; this serves to accommodate the required fuel injection duration per unit of time while keeping the IDDC below or equal to MID. The controller 14 then stores the newly determined combustor frequency value for the present control loop.

As noted above, the MID is a function of the target fill fraction, and the fill fraction can be selected to be somewhat lower or higher than 1.0 to account for practical limitations. If the target fill fraction is programmed to be a value that is not 1.0 then the MID value will change accordingly, and the combustor 14 will adjust the combustion frequency to keep the IDDC below this MID value.

Alternatively, the combustion frequency for the present control loop can be calculated as the value which causes the IDDC to equal the MID, in which case the combustion frequency equals the duty cycle divided by the MID. This combustion frequency represents the minimum combustion frequency that can be set by the controller 14 without unburnt fuel leaking out of the combustor discharge opening.

As would be apparent to those of skill in the art, the combustion frequency value is adjusted only within the operational range of the combustor 12, such that the combustor 12 can operate continuously (similar in concept to the allowable RPM range in an internal combustion engine).

6—Calculate the Ignition Timing for the Current State (Step 70).

Ignition timing, otherwise know as "ignition phase lag", is a function of combustion frequency, air flow rate, combustor dimensions and injection duration. As with the required fuel flow rate calculated at step 3, in another embodiment the ignition timing may be calculated by the PID controller 14, or using a fuzzy logic control, or any other conventional control method known to those of skill in the art.

The controller 14 may be utilized to adjust the ignition phase lag to obtain optimum detonation characteristics. This could be to achieve highest power, least unburnt fuel, maximum combustion pressure or other engine parameters. The control loop (example PID loop) would vary the ignition timing based on the feedback from any of these signals to achieve the desired process variable.

7—Save the Calculations from Steps 1-6 for the Next Combustion Cycle and Send Control Signals to Fuel Injection and Ignition Assemblies.

The updated operational parameters as calculated in steps 1 to 6 are saved in the controller 14 for use in the next combustion cycle. These operational parameters include: required combustor output (target load set point), required fuel flow rate, injector duty cycle, combustion frequency value, and ignition phase lag.

The controller 14 then determines the required fuel pump pressure setting, fuel injector timing, and ignition timing required to meet the updated operational parameters and sends respective control signals to the fuel pump 44, fuel injection assembly 46, and ignition assembly 18 to adjust their operational settings as necessary.

8—Return to Step 1 and Repeat.

Steps 1 to 7 represents the main operational control loop for combustor control, and may be iterated at a selected frequency that is independent of the detonation frequency. For example, the control loop can be iterated at a rate that is between 10-1000 combustion cycles per second.

CONCLUSION

Except where indicated otherwise, all of the steps and tasks described herein may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, be composed of multiple distinct computers or computing devices (e.g., physical servers, workstations, storage arrays, etc.) that communicate and interoperate over a network to perform the described functions. Each such computing device typically includes a processor (or multiple processors) that executes program instructions stored in a memory or other computer-readable medium. The results of the disclosed methods may be persistently stored by transforming physical storage devices, such as solid state memory chips and/or magnetic disks, into a different state.

In the preceding description, the controller 14 is explained in relation to maintaining a substantially stoichiometric air and fuel mixture. While a stoichiometric mixture is the most probable air/fuel mixture for many applications, the controller is also capable of mixing rich or lean air and fuel mixtures. In order to achieve lean or rich fuel mixtures, the controller 14 may reduce or increase the fuel line pressure to achieve the required equivalence ratio. Equivalence ratio is defined as the ratio of actual or required fuel-to-air ratio to the stoichiometric fuel-to-air ratio. Therefore, equivalence ratios higher than one represent rich mixtures and equivalence ratios less than one represent lean mixtures. A stoichiometric mixture has an equivalence ratio of unity.

In an alternative embodiment, the controller 14 is programmed with one or more selected equivalence ratios. To achieve a desired equivalence ratio, the controller 14 changes the pressure drop across the fuel injector (by changing the pressure in the fuel supply line). The controller 14 calculates the actual fuel flow rate based on the injection duration and pressure differential across the injectors and adjusts the fuel line pressure accordingly to achieve the selected equivalence ratio. As would be apparent to those of skill in the art, the other parameters in steps 1-8 need not be affected by the equivalence ratio. However, certain corrections may be applied to enhance the combustion process (by way of example to the ignition timing).

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

What is claimed is:

1. A method of controlling operation of a pressure gain combustor having a fuel pressurizing means, a fuel injector, and an ignition assembly, the method comprising:
 (a) determining a fuel injector duty cycle and a combustion frequency that meets a target load set point and a target fill fraction of the combustor, comprising directly measuring an air flow rate through the combustor with an air flow sensor, determining a fuel flow rate that is proportional to the air flow rate and which meets the target load set point, determining a maximum fuel injection duration ("MID") in the combustor that is a function of the target fill fraction, determining a required fuel injection duration per detonation cycle (IDDC) being the fuel injector duty cycle divided by the combustion frequency, and selecting the combustion frequency such that the IDDC is less than or equal to the MID;
 (b) determining a fuel supply pressure setting, a fuel injector timing setting and an ignition timing setting that achieves the determined fuel injector duty cycle and combustion frequency; and (c) sending a fuel supply pressure control signal with the fuel supply pressure setting to the fuel pressurizing means and operating the fuel pressurizing means at the fuel supply pressure setting, sending a fuel injector control signal with the fuel injector timing setting to the fuel injector and operating the fuel injector at the fuel injector timing setting, and sending an ignition timing control signal with the ignition timing setting to the ignition assembly and operating the ignition assembly at the ignition timing setting.

2. The method as claimed in claim 1 wherein the determining a fuel flow rate that is proportional to the air flow rate and which meets the target load set point comprises determining a stoichiometric oxidant/fuel ratio.

3. The method as claimed in claim 1 further comprising selecting at least one equivalence ratio, and determining a fuel flow rate that meets the target load set point and the selected equivalence ratio.

4. The method as claimed in claim 1 further comprising measuring a pressure inside an oxidant/fuel mixing chamber of the combustor and wherein the fuel pressurizing means operating at the fuel pressure setting provides a pressure sufficient to deliver fuel into the mixing chamber to achieve the determined fuel flow rate.

5. The method as claimed in claim 1 further comprising determining an ignition phase lag for the combustor and wherein the ignition timing control signal further includes the determining ignition phase lag.

6. The method as claimed in claim 1 wherein the target fill fraction is a value between 0.8 and 1.1.

7. A controller for a pressure gain combustor having a fuel pressurizing means, a fuel injector, and an ignition assembly, the controller comprising a processor and a memory programmed with steps and instructions executable by the processor to:
  (a) determine a fuel injector duty cycle and a combustion frequency that meets a target load set point and a target fill fraction of the combustor, comprising receiving a measurement of an air flow rate through the combustor taken directly by an air flow sensor, determining a fuel flow rate that is proportional to the air flow rate and which meets the target load set point, determining a maximum fuel injection duration ("MID") in the combustor, determining a required fuel injection duration per detonation cycle (IDDC) being the fuel injector duty cycle divided by the combustion frequency, and selecting the combustion frequency such that the IDDC is less than or equal to the MID;
  (b) determine a fuel supply pressure setting, a fuel injector timing setting and an ignition timing setting that achieves the determined fuel injector duty cycle and combustion frequency; and
  (c) send a fuel supply pressure control signal with the fuel supply pressure setting to the fuel pressurizing means such that the fuel pressurizing means operates at the fuel supply pressure setting, send a fuel injector control signal with the fuel injector timing setting to the fuel injector such that the fuel injector operates at the fuel injector timing setting, and send an ignition timing control signal with the ignition timing setting to the ignition assembly such that the ignition assembly operates at the ignition timing setting.

8. The controller as claimed in claim 7 wherein the determining a fuel flow rate that is proportional to the air flow rate and which meets the target load set point comprises determining a stoichiometric oxidant/fuel ratio.

9. The controller as claimed in claim 8 further programmed with the step of selecting at least one equivalence ratio, and determining a fuel flow rate that meets the target load set point and the selected equivalence ratio.

10. The controller as claimed in claim 7 further programmed with the step of measuring a pressure inside an oxidant/fuel mixing chamber of the combustor and wherein the fuel supply pressure setting provides a fuel supply pressure sufficient to deliver fuel into the mixing chamber to achieve the determined fuel flow rate.

11. The controller as claimed in claim 7 further programmed with the step of determining an ignition phase lag for the combustor and wherein the ignition timing control signal further includes the determining ignition phase lag.

12. The controller as claimed in claim 7 wherein the target fill fraction is a value between 0.8 and 1.1.

13. The controller as claimed in claim 7, wherein the pressure gain combustor is fluidly coupled to a compressor and turbine system to generate mechanical power.

14. A pressure gain combustor comprising:
  (a) a fuel pressurizing means,
  (b) a fuel injector fluidly coupled to the fuel pressurizing means;
  (c) a mixing chamber fluidly coupled to the fuel injector and to an oxidant supply;
  (d) a combustion chamber in fluid communication with the mixing chamber;
  (e) an ignition assembly in fluid communication with the combustion chamber;
  (f) an air flow sensor; and
  (g) a controller comprising a processor and a memory programmed with steps and instructions executable by the processor to:
    (i) determine a fuel injector duty cycle and a combustion frequency that meets a target load set point and a target fill fraction of the combustor, which comprises receiving a measurement of an air flow rate through the combustor taken directly by the air flow sensor, determining a fuel flow rate that is proportional to the air flow rate and which meets the target load set point, determining a maximum fuel injection duration ("MID") in the combustor, determining a required fuel injection duration per detonation cycle (IDDC) being the fuel injector duty cycle divided by the combustion frequency, and selecting the combustion frequency such that the IDDC is less than or equal to the MID;
    (ii) determine a fuel pump pressure setting, a fuel injector timing setting and an ignition timing setting that achieves the determined fuel injector duty cycle and combustion frequency; and
    (iii) send a fuel pump control signal with the fuel pump pressure setting to the fuel pump, a fuel injector control signal with the fuel injector timing setting to the fuel injector, and an ignition timing control signal with the ignition timing setting to the ignition assembly.

15. The pressure gain combustor as claimed in claim 14, wherein an exhaust outlet of the combustor is fluidly coupled to a compressor and turbine system to generate mechanical power.

16. The pressure gain combustor as claimed in claim 15 wherein an input load for the target load set point is the rotational speed of a turbine shaft of the turbine system.

* * * * *